United States Patent
Avrukin et al.

(10) Patent No.: US 10,515,030 B2
(45) Date of Patent: Dec. 24, 2019

(54) METHOD AND DEVICE FOR IMPROVED ADVANCED MICROCONTROLLER BUS ARCHITECTURE (AMBA) AND ADVANCED EXTENSIBLE INTERFACE (AXI) OPERATIONS

(71) Applicant: LG ELECTRONICS INC., Seoul (KR)

(72) Inventors: Arkadi Avrukin, Santa Clara, CA (US); Seungyoon Song, Santa Clara, CA (US); Milan Shah, Santa Clara, CA (US); Thomas Zou, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/301,160

(22) PCT Filed: May 12, 2017

(86) PCT No.: PCT/KR2017/004977
§ 371 (c)(1),
(2) Date: Nov. 13, 2018

(87) PCT Pub. No.: WO2017/196143
PCT Pub. Date: Nov. 16, 2017

(65) Prior Publication Data
US 2019/0188164 A1   Jun. 20, 2019

Related U.S. Application Data

(60) Provisional application No. 62/335,652, filed on May 12, 2016.

(51) Int. Cl.
G06F 13/16    (2006.01)
G06F 13/40    (2006.01)
G06F 13/42    (2006.01)
G06F 12/0804  (2016.01)
(Continued)

(52) U.S. Cl.
CPC ........ *G06F 13/1673* (2013.01); *G06F 3/0658* (2013.01); *G06F 12/084* (2013.01);
(Continued)

(58) Field of Classification Search
CPC ............. G06F 12/0897; G06F 13/1673; G06F 12/0862; G06F 12/084; G06F 3/0658;
(Continued)

(56) References Cited

U.S. PATENT DOCUMENTS

2007/0283101 A1    12/2007 El-Essawy et al.
2009/0019229 A1    1/2009 Morrow et al.
(Continued)

FOREIGN PATENT DOCUMENTS

WO    2009064793    5/2009

OTHER PUBLICATIONS

PCT International Application No. PCT/KR2017/004977, Notification of Transmittal of the International Search Report and the Written Opinion of the International Searching Authority, or Declaration dated Aug. 23, 2017, 10 pages.
(Continued)

*Primary Examiner* — Glenn A. Auve
(74) *Attorney, Agent, or Firm* — Lee, Hong, Degerman, Kang & Waimey

(57) ABSTRACT

An Advanced Microcontroller Bus Architecture (AMBA)/Advanced eXtensible Interface (AXI) compatible device and corresponding method capable of efficient reordering of responses from a last level cache (LLC) and/or dynamic random access memory (DRAM).

2 Claims, 15 Drawing Sheets

(51) Int. Cl.
*G06F 12/084* (2016.01)
*G06F 12/0862* (2016.01)
*G06F 12/0897* (2016.01)
*G06F 3/06* (2006.01)
*G06F 15/78* (2006.01)

(52) U.S. Cl.
CPC ...... *G06F 12/0804* (2013.01); *G06F 12/0862* (2013.01); *G06F 12/0897* (2013.01); *G06F 13/40* (2013.01); *G06F 13/4234* (2013.01); *G06F 15/7807* (2013.01); *G06F 2212/1032* (2013.01); *G06F 2212/602* (2013.01); *G06F 2212/608* (2013.01); *Y02D 10/14* (2018.01); *Y02D 10/151* (2018.01)

(58) Field of Classification Search
CPC .. G06F 12/0804; G06F 13/4234; G06F 13/40; G06F 2212/608; G06F 2212/602; G06F 15/7807; G06F 2212/1032; Y02D 10/151; Y02D 10/14
See application file for complete search history.

(56) References Cited

U.S. PATENT DOCUMENTS

| | | |
|---|---|---|
| 2012/0072673 A1 | 3/2012 | Chirca et al. |
| 2012/0117323 A1 | 5/2012 | Cypher et al. |
| 2012/0131246 A1 | 5/2012 | Jeong et al. |
| 2013/0024624 A1 | 1/2013 | Benhase et al. |
| 2015/0199286 A1* | 7/2015 | Hughes ............... G06F 13/1673 710/310 |
| 2015/0286571 A1 | 10/2015 | Cain, III et al. |
| 2015/0301962 A1 | 10/2015 | Laughton et al. |
| 2015/0356014 A1 | 12/2015 | Sathish et al. |

OTHER PUBLICATIONS

PCT International Application No. PCT/KR2017/004975, Notification of Transmittal of the International Search Report and the Written Opinion of the International Searching Authority, or Declaration dated Sep. 19, 2017, 11 pages.

\* cited by examiner

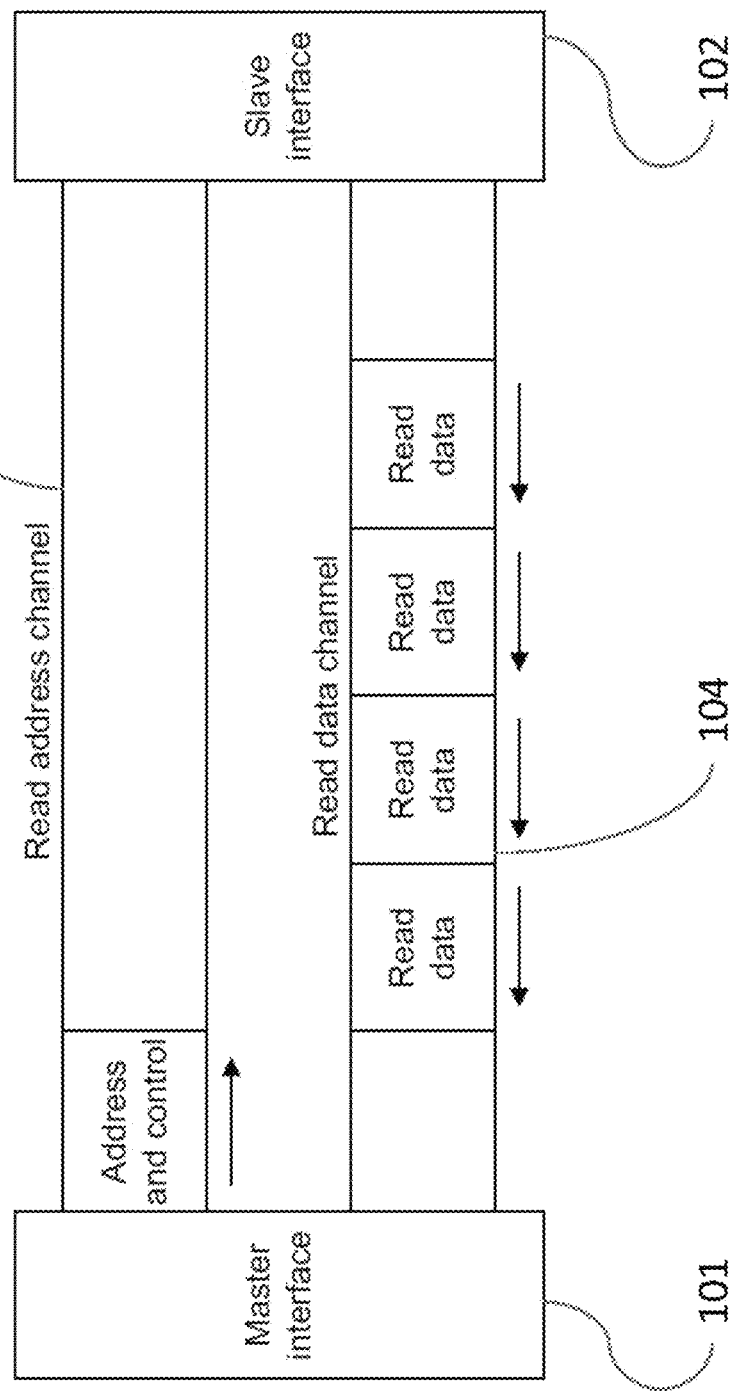

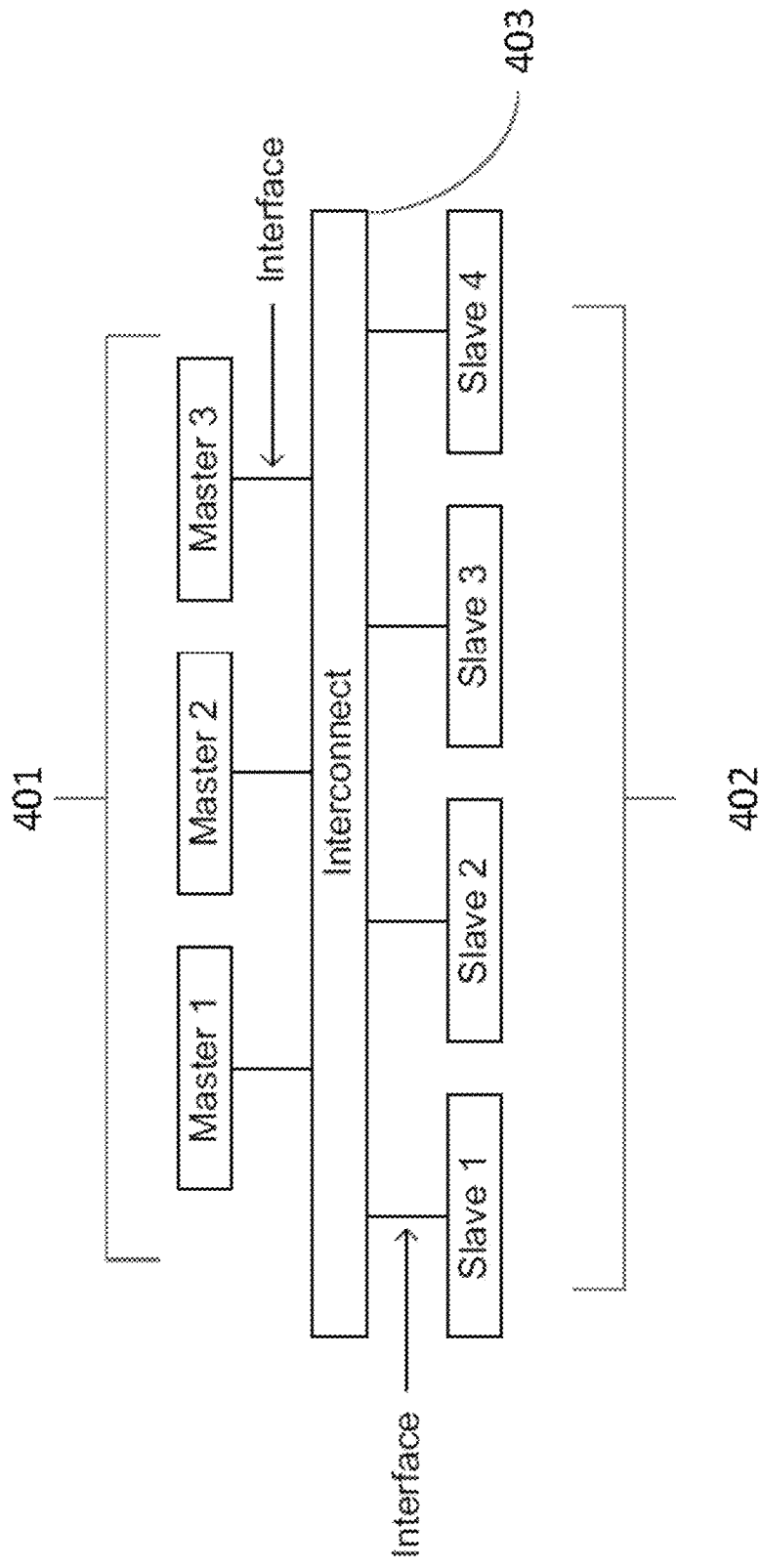

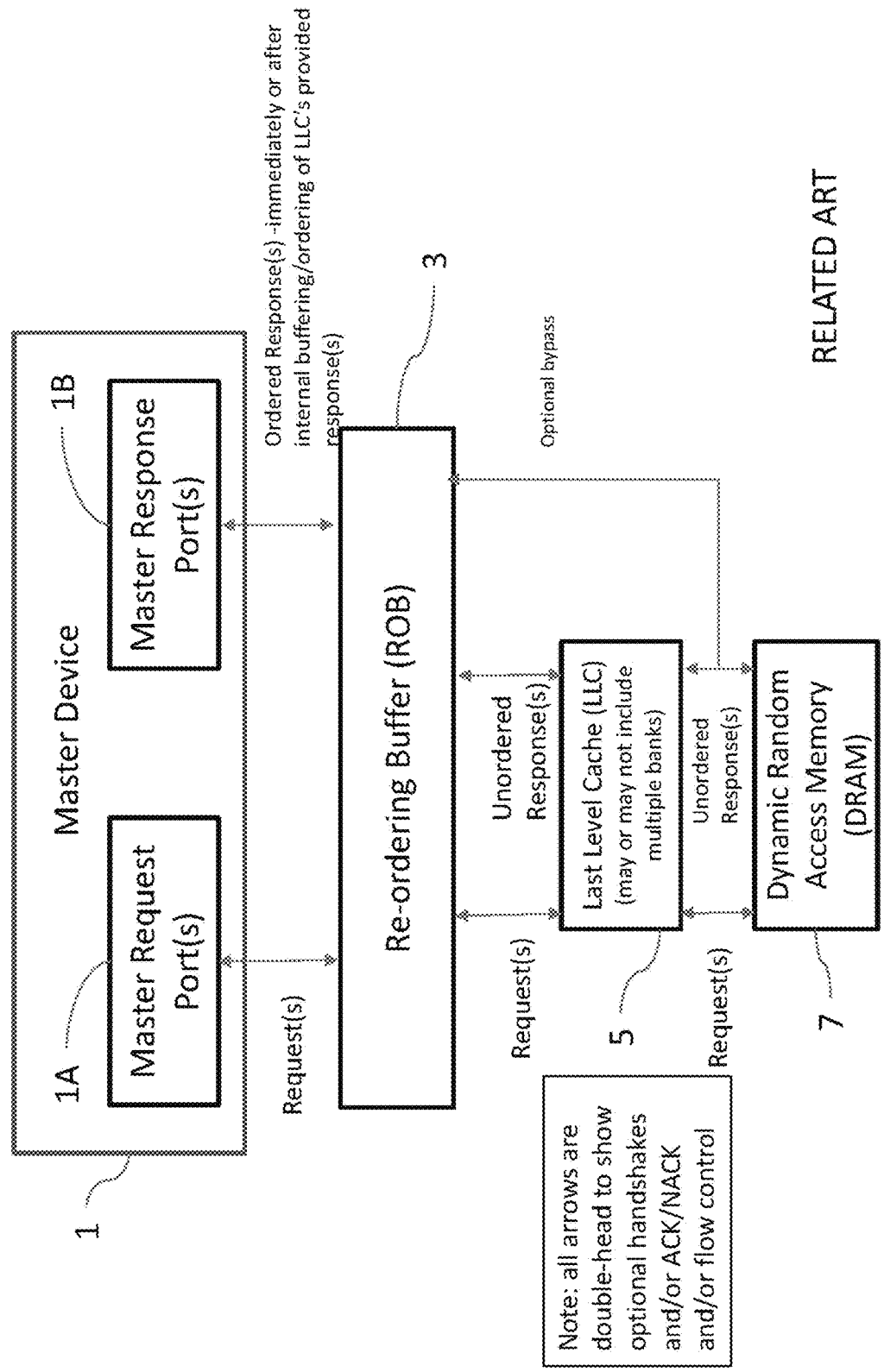

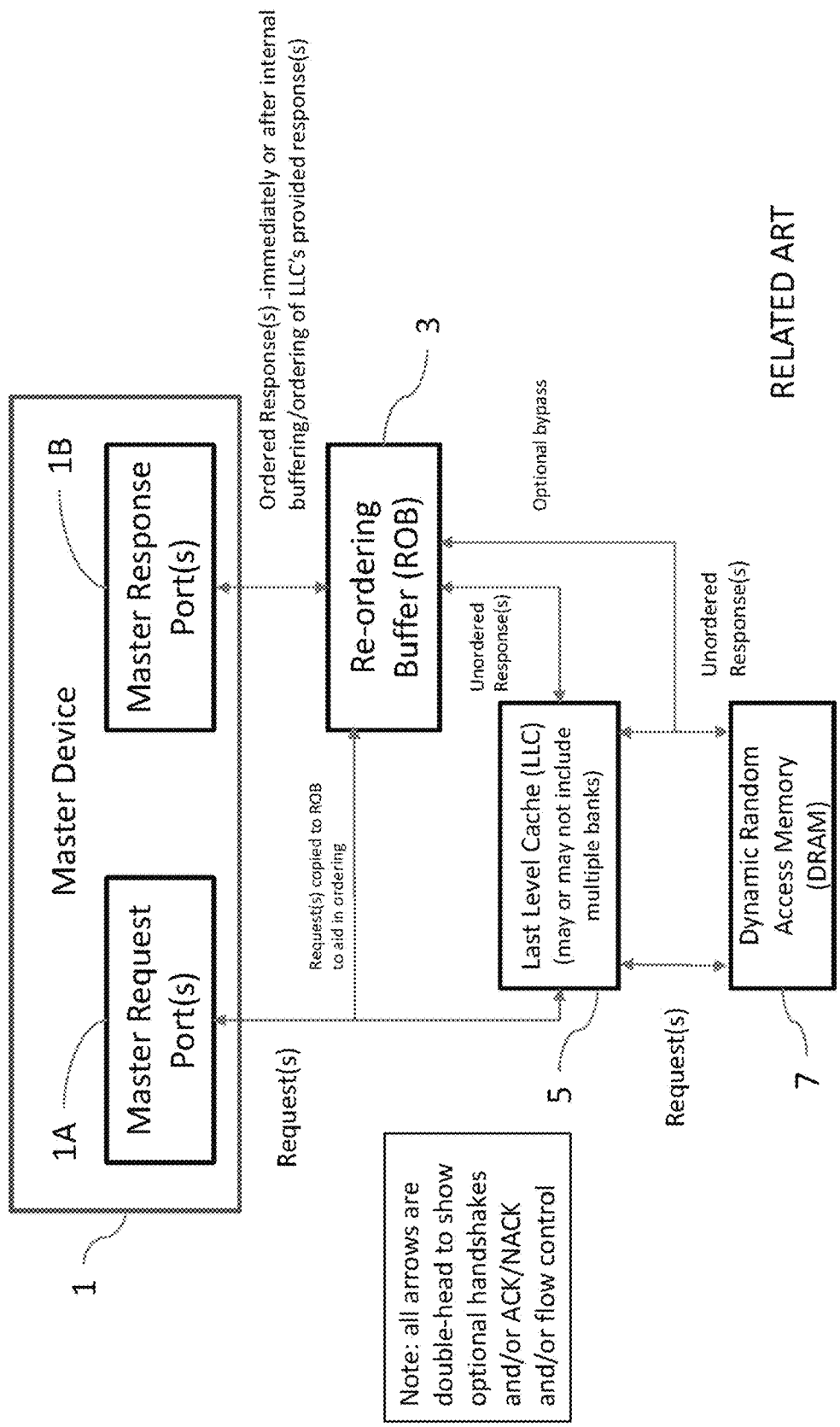

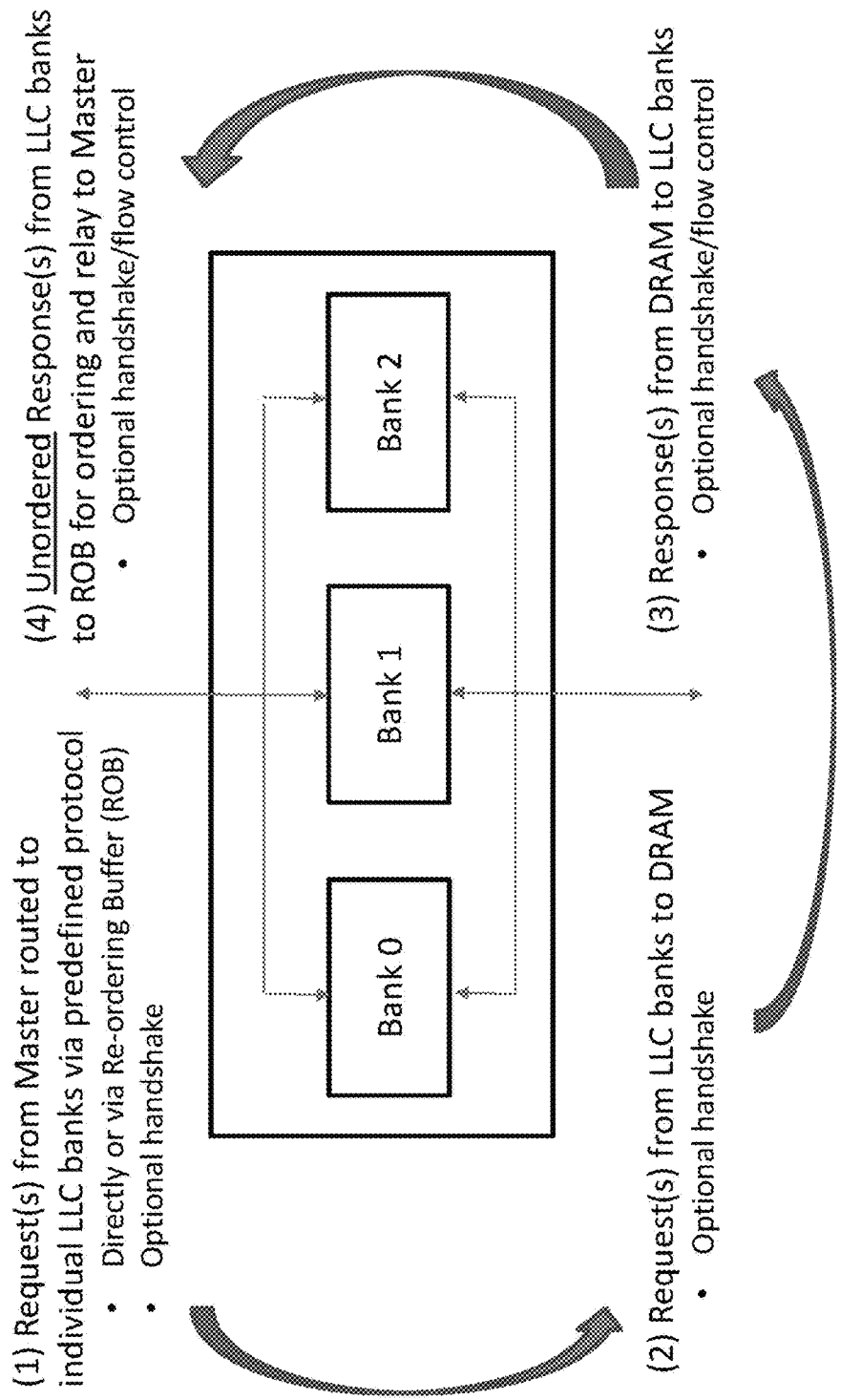

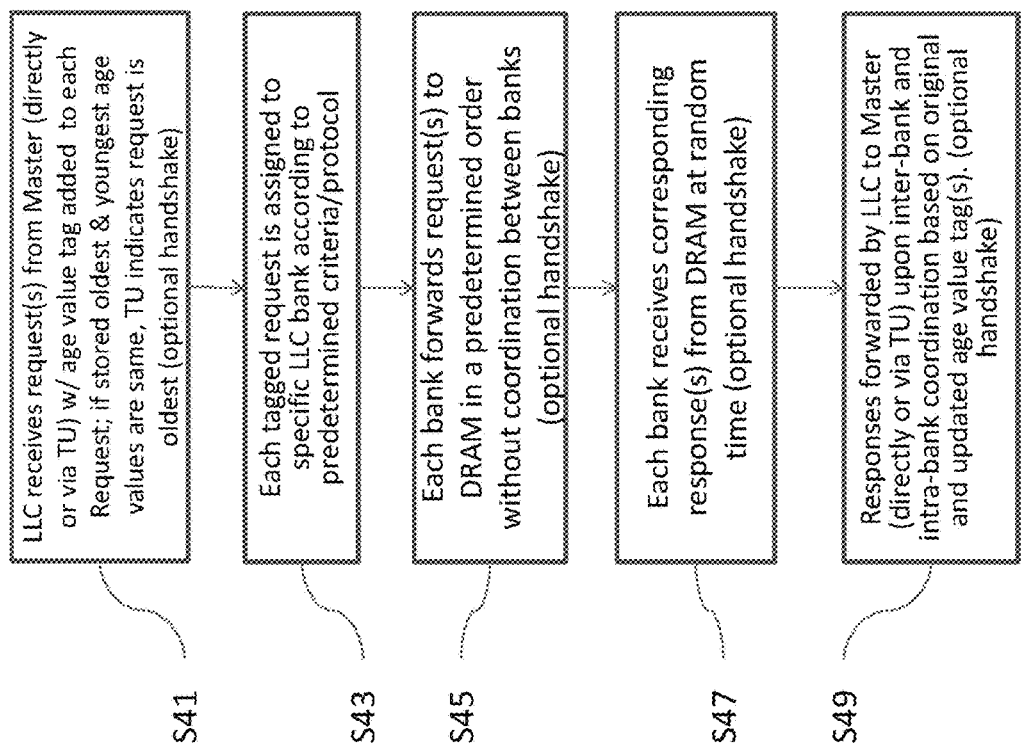

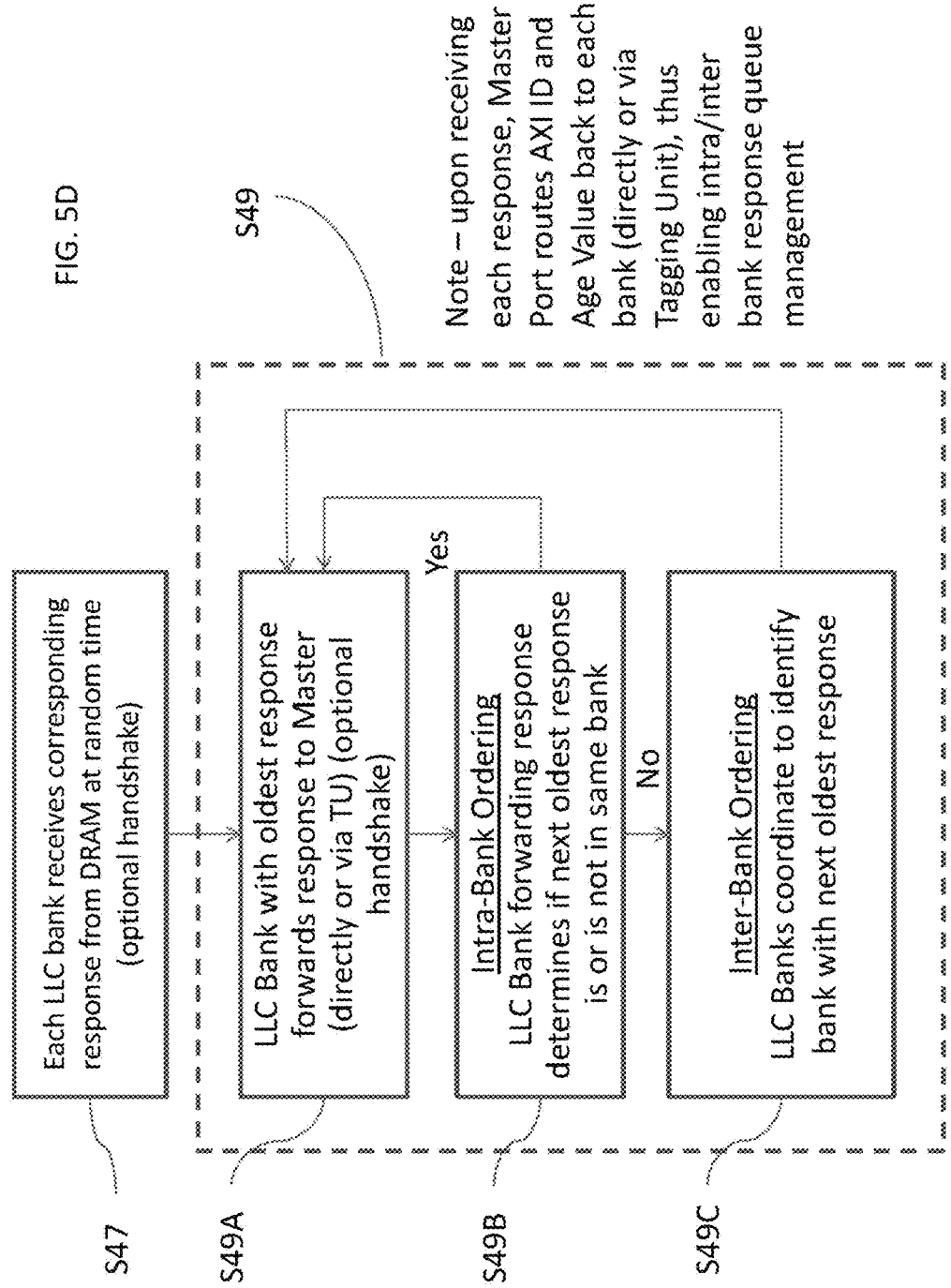

METHOD AND DEVICE FOR IMPROVED ADVANCED MICROCONTROLLER BUS ARCHITECTURE (AMBA) AND ADVANCED EXTENSIBLE INTERFACE (AXI) OPERATIONS

CROSS-REFERENCE TO RELATED APPLICATIONS

This application is the National Stage filing under 35 U.S.C. 371 of International Application No. PCT/KR2017/004977, filed on May 12, 2017, which claims the benefit of U.S. Provisional Application No. 62/335,652, filed on May 12, 2016, the contents of which are all hereby incorporated by reference herein in their entirety.

TECHNICAL FIELD

The present invention generally relates to An Advanced Microcontroller Bus Architecture (AMBA)/Advanced eXtensible Interface (AXI) compatible device and corresponding method capable of efficient reordering of responses from a last level cache (LLC) and/or dynamic random access memory (DRAM).

BACKGROUND ART

The Advanced Microcontroller Bus Architecture (AMBA) and Advanced eXtensible Interface (AXI) protocol are described in the AMBA AXI and ACE Protocol Specification Issue E (incorporated in its entirety by reference). This document describes the following: the AMBA 3 AXI protocol (referred to as AXI3); the AMBA 4 AXI protocol (referred to as AXI4 and AXI4-LITE); and the AMBA 4 protocol (referred to as ACE and ACE-LITE).

The AMBA and AXI protocols are used in many modern communication devices such as smart phones and tablets. The AMBA AXI protocol supports high performance, high frequency system designs.

The AXI protocol: a) is suitable for high-bandwidth and low-latency designs; b) provides high-frequency operation without using complex bridges; c) meets the interface requirements of a wide range of components; d) is suitable for memory controllers with high initial access latency; e) provides flexibility in the implementation of interconnect architectures; f) is backward-compatible with existing AHB and APB interfaces. The key features of the AXI protocol are: a) separate address/control and data phases; b) support for unaligned data transfers, c) using byte strobes; d) uses burst-based transactions with only the start address issued; e) separate read and write data channels, that can provide low-cost Direct Memory Access (DMA); f) support for issuing multiple outstanding addresses; g) support for out-of-order transaction completion; and h) permits easy addition of register stages to provide timing closure. The AXI protocol includes the optional extensions that cover signaling for low-power operation. The AXI protocol includes the AXI4-Lite specification, a subset of AXI4 for communication with simpler control register style interfaces within components.

The AXI protocol is burst-based and defines the following independent transaction channels: read address; read data; write address; write data; write response. An address channel carries control information that describes the nature of the data to be transferred. The data is transferred between master and slave using either: A write data channel to transfer data from the master to the slave (here, the slave uses the write response channel to signal the completion of the transfer to the master; and A read data channel to transfer data from the slave to the master. The AXI protocol: permits address information to be issued ahead of the actual data transfer; supports multiple outstanding transactions; and supports out-of-order completion of transactions.

FIG. 1A shows how a read transaction uses the read address and read data channels. Here, a Master Interface (101) sends address and control information to Slave Interface (102) via a read address channel (103). Corresponding responses (read data) are sent from the Slave Interface (102) to the Master Interface (101) via read data channel (104).

FIG. 1B shows how a write transaction uses the write address, write data, and write response channels. Here, a Master Interface (201) sends address and control information to Slave Interface (202) via a write address channel (203). Thereafter, corresponding write data is sent from the Master Interface (201) to the Slave Interface (202) via a write data channel (204). A corresponding write response is then sent from the Slave Interface (202) to the Master Interface (201) via a write response channel (205).

In FIGS. 1A and 1B, each of the independent channels consists of a set of information signals and VALID and READY signals that provide a two-way handshake mechanism. The information source uses the VALID signal to show when valid address, data or control information is available on the channel. The destination uses the READY signal to show when it can accept the information. Both the read data channel and the write data channel also include a LAST signal to indicate the transfer of the final data item in a transaction. Read and write transactions each have their own address channel. The appropriate address channel carries all of the required address and control information for a transaction.

The read data channel carries both the read data and the read response information from the slave to the master, and includes: a) the data bus, that can be 8, 16, 32, 64, 128, 256, 512, or 1024 bits wide; and b) a read response signal indicating the completion status of the read transaction.

The write data channel carries the write data from the master to the slave and includes: a) the data bus, that can be 8, 16, 32, 64, 128, 256, 512, or 1024 bits wide; and b) a byte lane strobe signal for every eight data bits, indicating which bytes of the data are valid. Write data channel information is always treated as buffered, so that the master can perform write transactions without slave acknowledgement of previous write transactions.

A slave uses the write response channel to respond to write transactions. All write transactions require completion signaling on the write response channel. As shown in FIG. 1B, completion is signaled only for a complete transaction, not for each data transfer in a transaction.

FIG. 1C shows an AXI system that includes a number of master (401) and slave devices (402) connected together through some form of interconnect (403). Here, the AXI protocol provides a single interface definition, for the interfaces: a) between a master and the interconnect; b) between a slave and the interconnect; and c) between a master and a slave. This interface definition supports a variety of different interconnect implementations. (Note: An interconnect between devices is equivalent to another device with symmetrical master and slave ports to which real master and slave devices can be connected.)

Most systems use one of three interconnect topologies: a) shared address and data buses; b) shared address buses and multiple data buses; and/or c) multilayer, with multiple address and data buses. In most systems, the address channel bandwidth requirement is significantly less than the data channel bandwidth requirement. Such systems can achieve a good balance between system performance and interconnect complexity by using a shared address bus with multiple data buses to enable parallel data transfers.

Each AXI channel transfers information in only one direction, and the architecture does not require any fixed relationship between the channels. This means a register slice can be inserted at almost any point in any channel, at the cost of an additional cycle of latency. This makes possible: a) a trade-off between cycles of latency and maximum frequency of operation; and b) a direct, fast connection between a processor and high performance memory.

All AXI transaction channels use a common VALID/READY handshake process to transfer address, data, and control information. This two-way flow control mechanism means both the master and slave can control the rate at which the information moves between master and slave. The source generates the VALID signal to indicate when the address, data or control information is available. The destination generates the READY signal to indicate that it can accept the information. Transfer occurs only when both the VALID and READY signals are HIGH.

The AXI protocol requires the following relationships to be maintained: a) a write response must always follow the last write transfer in the write transaction of which it is a part; b) read data must always follow the address to which the data relates; c) channel handshakes must conform to the pre-defined dependencies. Otherwise, the protocol does not define any relationship between the channels. This means, for example, that the write data can appear at an interface before the write address for the transaction. This can occur if the write address channel contains more register stages than the write data channel. Similarly, the write data might appear in the same cycle as the address.

When an AXI master initiates an AXI operation, targeting an AXI slave: a) the complete set of required operations on the AXI bus form the AXI Transaction; b) any required payload data is transferred as an AXI Burst; and c) a burst can comprise multiple data transfers, or AXI Beats.

In the protocol, there are 12 memory types: 1) Device Non-bufferable; 2) Device Bufferable; 3) Normal Non-cacheable Non-bufferable; 4) Normal Non-cacheable Bufferable; 5) Write-through No-allocate; 6) Write-through Read-allocate; 7) Write-through Write-allocate; 8) Write-through Read and Write-allocate; 9) Write-back No-allocate; 10) Write-back Read-allocate; 11) Write-back Write-allocate; and 12) Write-back Read and Write-allocate. Each memory type operates according to standard-defined rules. Also, the same memory type can have different encodings on the read channel and write channel.

Write accesses to the following memory types do not require a transaction response from the final destination, but do require that write transactions are made visible at the final destination In a timely manner: a) Device Bufferable; b) Normal Non-cacheable Bufferable; and c) Write-through. For write transactions, all three memory types require the same behavior. For read transactions, the required behavior is as follows: a) for Device Bufferable memory, read data must be obtained from the final destination; b) for Normal Non-cacheable Bufferable memory, read data must be obtained either from the final destination or from a write transaction that is progressing to its final destination; and c) for Write-through memory, read data can be obtained from an intermediate cached copy. In addition to ensuring that write transactions progress towards their final destination in a timely manner, intermediate buffers must behave as follows: a) An intermediate buffer that can respond to a transaction must ensure that, over time, any read transaction to Normal Non-cacheable Bufferable propagates towards its destination. This means that, when forwarding a read transaction, the attempted forwarding must not continue indefinitely, and any data used for forwarding must not persist indefinitely. The protocol does not define any mechanism for determining how long data used for forwarding a read transaction can persist. However, in such a mechanism, the act of reading the data must not reset the data timeout period; and b) An intermediate buffer that can hold and merge write transactions must ensure that transactions do not remain in its buffer indefinitely. For example, merging write transactions must not reset the mechanism that determines when a write is drained towards its final destination.

Regarding buffers for data transactions, the specification supports the combined use of Device Non-buffered and Device Buffered memory types to force write transactions to reach their final destination and ensure that the issuing master knows when the transaction is visible to all other masters. A write transaction that is marked as Device Buffered is required to reach its final destination in a timely manner. However, the write response for the transaction can be signaled by an intermediate buffer. Therefore, the issuing master cannot know when the write is visible to all other masters. If a master issues a Device Buffered write transaction, or stream of write transactions, followed by a Device Non-buffered write transaction, and all transactions use the same AXI ID, the AXI ordering requirements force all of the Device Buffered write transactions to reach the final destination before a response is given to the Device Non-buffered transaction. Therefore, the response to the Device Non-buffered transaction indicates that all the transactions are visible to all masters.

Regarding transaction ordering, a master can use an AWID (write address ID) and ARID (read address ID) transaction IDs to indicate its ordering requirements. The rules for the ordering of transactions are as follows: a) Transactions from different masters have no ordering restrictions. They can complete in any order. b) Transactions from the same master, but with different ID values, have no ordering restrictions. They can complete in any order. c) The data transfers for a sequence of read transactions with the same ARID value must be returned in the order in which the master issued the addresses. d) The data transfers for a sequence of write transactions with the same AWID value must complete in the order in which the master issued the addresses. e) There are no ordering restrictions between read and write transactions using a common value for AWID and ARID. f) Interconnect use of transaction identifiers correspond to how the AXI fabric extends the transaction ID values issued by AXI masters and slaves.

At a master interface, read data from transactions with the same ARID value must arrive in the order in which the master issued the addresses. Data from read transactions with different ARID values can arrive in any order. Read data of transactions with different ARID values can be interleaved. A slave must return read data for a sequence of transactions with the same ARID value in the order in which it received the addresses. In a sequence of read transactions with different ARID values, the slave can return the read data in any order, regardless of the order in which the transactions arrived. The slave must ensure that the RID value of any returned data matches the ARID value of the address to which it is responding. The interconnect must ensure that the read data from a sequence of transactions with the same ARID value targeting different slaves is received by the master in the order in which it issued the addresses. The read data re-ordering depth is the number of addresses pending in the slave that can be reordered. A slave that processes all transactions in order has a read data re-ordering depth of one. The read data re-ordering depth is a static value that must be specified by the designer of the slave.

FIGS. 2A-2B show a conceptual diagram for how conventional memory retrieval is performed in an AXI compliant environment. Here, a master device (1) has a master request port (1A) and a master response port (1B). Data is stored in a memory (7) (here, Dynamic Random Access Memory (DRAM)). Memory access is cooperatively managed by a Last Level Cache (LLC) (5) and a Re-ordering Buffer (ROB) (3). In FIG. 2A, requests and responses are routed via the ROB (3). In FIG. 2B, only responses are routed via the ROB (3). However, as seen in FIG. 2B, copies of the requests are sent to the ROB so that the ROB may perform bookkeeping operations to ensure that the responses are properly ordered. Also, FIGS. 2A and 2B show optional bypasses from the DRAM directly to the ROB. The optional bypass path is used for requests and/or responses that the system does not intend to place in the LLC. However, these requests/responses are still subject to the above-described ordering.

The term LLC stands for Last Level Cache. This term LLC denotes that the cache is the last caching agent in the system before memory (DRAM). In the current art, most systems have L1/L2/L3 caches. The "L-number" denotes the proximity to the master which can either be a CPU or GPU. In any system, the LLC is always the last caching agent and with the largest number in the "L-number".

As seen in FIG. 2C, the conventional ROB receives data requests from the Master device (S1). These requests are forwarded to the DRAM via the LLC. The ROB then receives un-ordered responses from the DRAM via the LLC (S3). The ROB determines whether or not response(s) can sent to Master in correct order (S5). Here, the ROB may use one or more criteria to determine whether or not response(s) can sent to Master in correct order. In general, the AXI ordering requirement of the Master is used to determine whether a request can be sent to master. However, other criteria may be used for multiple responses that each satisfy AXI ordering requirement of the Master. The criteria may be based on age of request, priority of request, ROB buffer capacity, and/or other parameters.

If the ROB can send the response(s) in the correct order, the ROB sends them (S7). However, if the ROB cannot send the response(s) in the correct order, the ROB internally buffers the response(s) until responses can be properly ordered (S9). Later, after the ROB determines that specific unordered response(s) within the ROB can now be correctly ordered and sent to Master (S11), the ROB sends the specific response(s) to Master in the proper order (S13).

In other conventional approaches, as seen in FIG. 3A, the Last Level Cache (LLC) may include multiple banks that manage data requests and responses. Here, request(s) from the Master are routed to individual LLC banks via a predefined protocol (1). The banks then send the requests to the DRAM (2). The LLC banks then receive the responses from the DRAM (3). The LLC banks then send unordered responses to the Master via the ROB for subsequent ordering (4).

Thus, as seen in FIG. 3B, the conventional LLC receives request(s) from Master directly or via Re-ordering Buffer (S31). Each request is assigned to specific LLC bank according to predetermined criteria/protocol (S33). An exemplary specific criterion would be by address, where by each bank owns a portion of the total address space. Each bank forwards request to DRAM in predetermined (e.g., FIFO) order without coordination between banks (S35). Each bank receives corresponding response from DRAM at random time (S37). To optimize performance, the requests are processed in some optimal order unrelated to send or receive order. Modern DRAM requires intelligent out of order processing to maintain bandwidth and latency. Each bank forwards response to Re-ordering buffer in predetermined order without coordination between banks (S39).

With ever growing increases in smart phone/tablet complexity, the size, speed, complexity and number of memory accesses continues to grow. This growth has led to increased demands on (and growth in size of) respective buffers.

Modern caches tend to be based on static random access (SRAM) technology, whereas AXI-compliant buffers tend to be based on flip-flop or other non-SRAM technology. Thus, buffers tend to require more transistors per each stored bit. Buffers therefore tend to require more power and generate more heat than corresponding memory units. Larger, faster and more complex data demands has resulted in growth in re-ordering buffer size (i.e., more transistors), and therefore increased buffer power and circuit cooling.

DISCLOSURE OF THE INVENTION

Technical Problem

Thus, as discovered by the present inventors, in order to reduce device power demands and heat signatures, a method and device is needed for handling larger and faster AXI-compliant memory requests without requiring larger re-ordering buffers.

Solution to Problem

In order to reduce device power demands and heat signatures, the present invention is directed to a method and device for handling AXI compliant memory requests without requiring larger re-ordering buffers.

According to one embodiment, there is an Advanced Microcontroller Bus Architecture (AMBA)/Advanced eXtensible Interface (AXI) compatible device and corresponding method, where the device includes: a master device including a master request port and a master response port; a last level cache (LLC) configured to receive a first plurality of data requests from the master request port; a re-ordering buffer configured to receive ordering information about the first data request from the master request port; and a memory. The memory is configured to: receive a second plurality of data requests from the LLC, the second plurality of data requests related to the first plurality of data requests, and in response to the second plurality of data requests, send a plurality of unordered data responses to the re-ordering buffer. The re-ordering buffer is further configured to: determine whether at least some of the plurality of unordered data responses can be ordered for forwarding to the master response port in accordance with the ordering information. Upon determining that at least some of the plurality of unordered data responses can be ordered in accordance with the ordering information: the re-ordering buffer is further configured to: order one or more of the orderable plurality of unordered data responses; and send the one or more ordered data responses to the master response port. Upon determining that at least one of the plurality of unordered data responses cannot be ordered in accordance with the ordering information, the re-ordering buffer is further configured to: coordinate with the LLC to store the at least one unorderable data response in the LLC along with a transaction identifier (ID); subsequently determine that the at least one unordered data response stored in the LLC can be ordered in accordance with the ordering information; and send a message with the transaction ID to the LLC to command the LLC to send the at least one data response stored in the LLC to the master response port in accordance with the ordering information.

According to another embodiment, there is an Advanced Microcontroller Bus Architecture (AMBA)/Advanced eXtensible Interface (AXI) compatible device that includes: a master device including a master request port and a master response port; and a last level cache (LLC) configured to receive a first plurality of data requests from the master request port, the LLC including a plurality of banks. Each bank of the plurality of banks includes a work queue, an inter-bank coordinator and an intra-bank coordinator, and the LLC is further configured to distribute the first plurality of data requests among a first bank and a second bank of the plurality of banks. The device also includes a tagging unit configured to: receive ordering information about the first plurality of data requests from the master request port; and forward at least a portion of the ordering information to the LLC. The device also includes a memory configured to: receive a second plurality of data requests from the first bank and the second bank of the LLC, the second plurality of data requests related to the first plurality of data requests, and in response to the second plurality of data requests, send a plurality of unordered data responses to the first bank and the second bank of the LLC, each unordered data response of the plurality of unordered data responses sent the first bank or the second bank that originated the corresponding data request. The first bank is configured to: perform intra-bank coordination to iteratively determine, based on the ordering information from the tagging unit, that the work queue of the first bank contains a response from the memory corresponding to the oldest request of the first plurality of data requests, and transmit, to the master response port, the response corresponding to the oldest request of the first plurality of data requests, upon determining, based on the ordering information from the tagging unit, that the work queue of first bank does not contain a response from the memory corresponding to the oldest request of the first plurality of data requests, perform inter-bank coordination with the second bank to determine whether the work queue of the first bank or the work queue of the second bank contains a response from the memory corresponding to the oldest request of the first plurality of data requests so that the first and second banks relay subsequent responses to the master response port in accordance with the ordering information from the tagging unit.

Advantageous Effects of Invention

One embodiment of the present invention provides capable of efficient reordering of responses from a last level cache (LLC) and/or dynamic random access memory (DRAM).

BRIEF DESCRIPTION OF DRAWINGS

FIG. 1A is block diagram showing AXI read transaction uses the read address and read data channels;

FIG. 1C is block diagram showing an AXI system that includes a number of master and slave devices connected together through some form of interconnect;

FIG. 2A is a conceptual block diagram showing how conventional memory retrieval is performed in an AXI compliant environment according to a first embodiment;

FIG. 2B is a conceptual block diagram showing how conventional memory retrieval is performed in an AXI compliant environment according to a second embodiment;

FIG. 3A is a conceptual block diagram of a conventional LLC with multiple banks;

FIG. 5C is a flow chart of operations according to the third embodiment of the invention; and FIG. 5D is a more detailed flow chart of operations of a LLC with multiple banks according to the third embodiment of the invention.

MODE FOR THE INVENTION

Figure 1B:
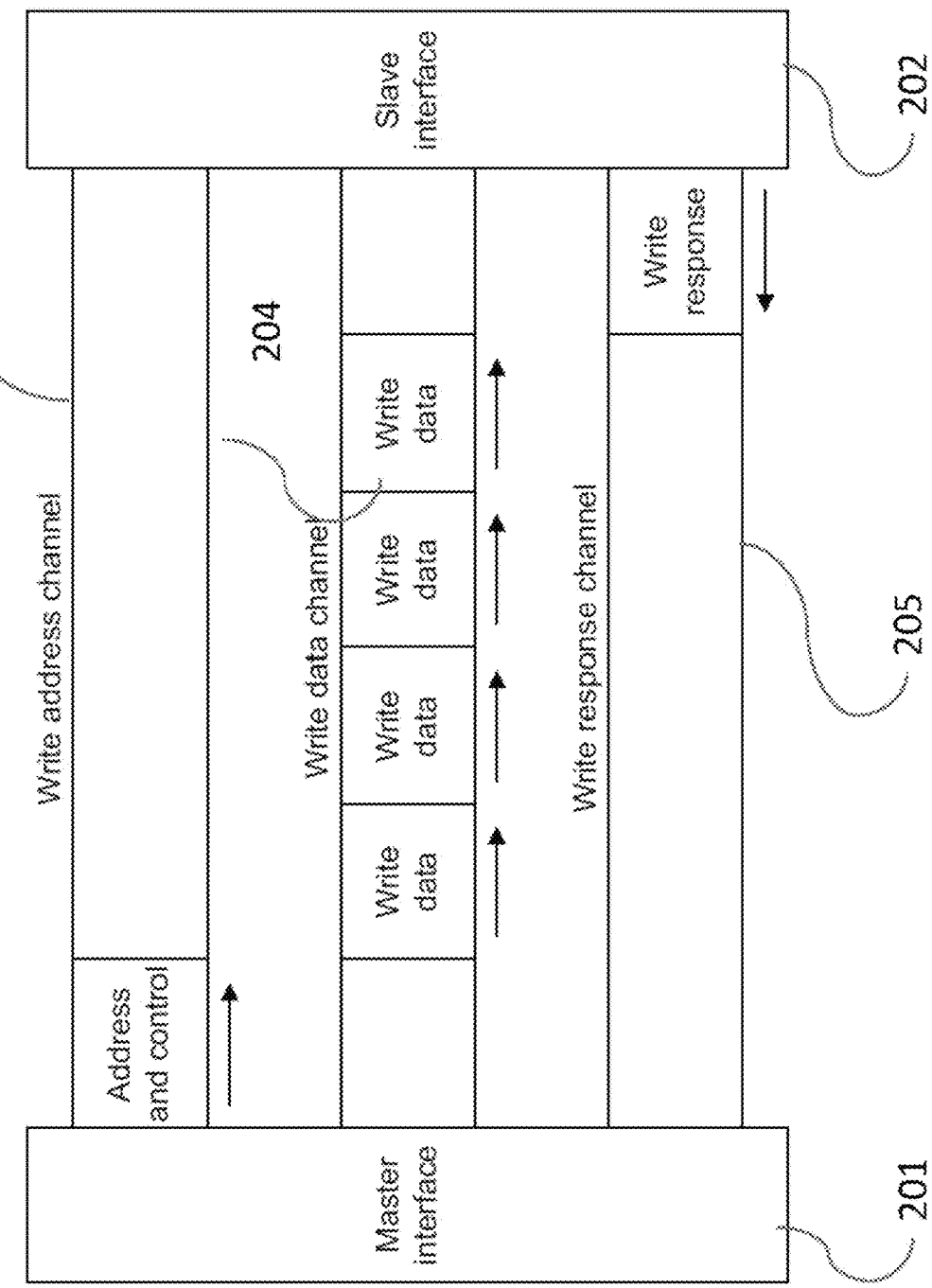
FIG. 1B is block diagram showing AXI write transaction uses the write address, write data, and write response channels.
Figure 2C:
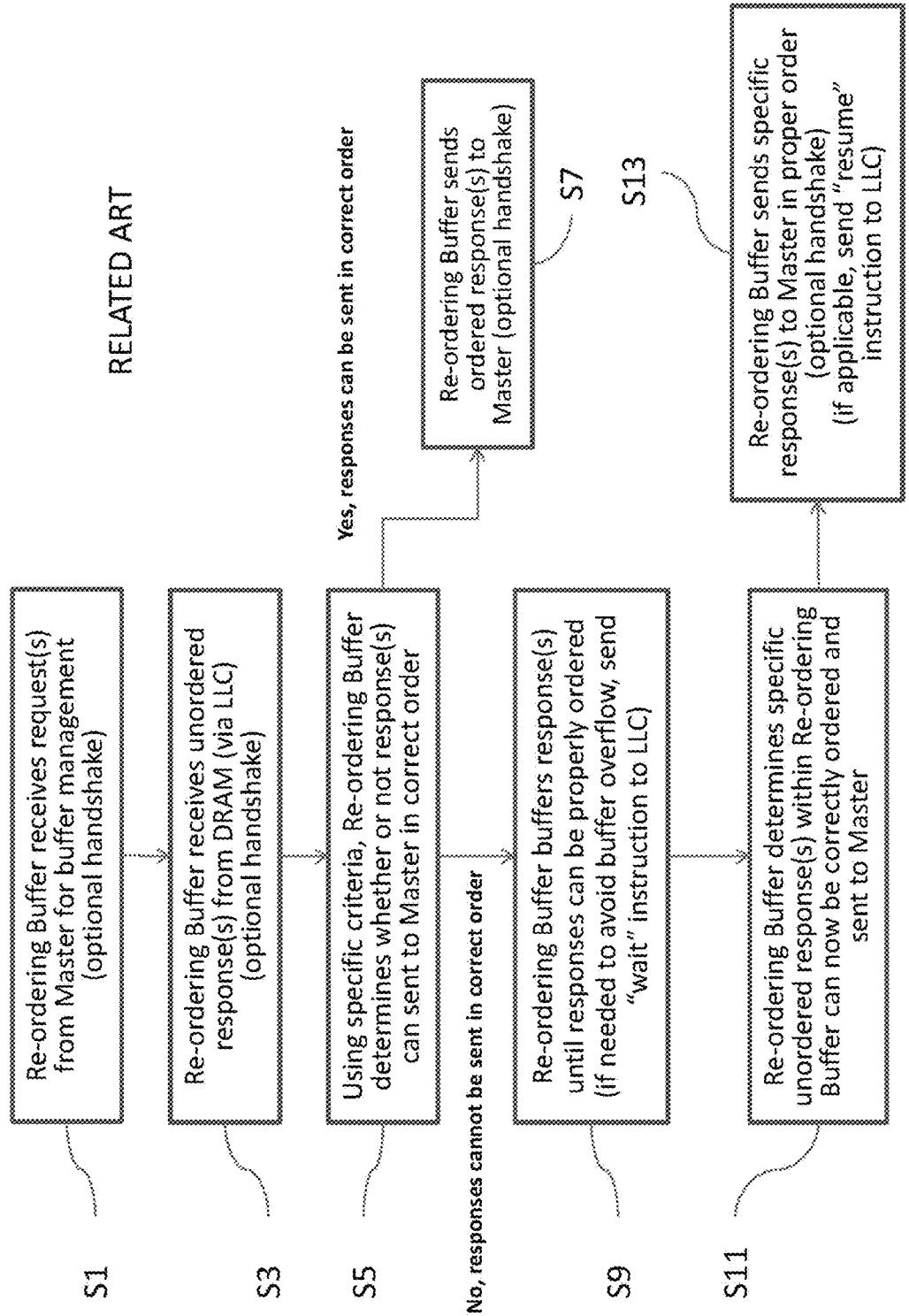
FIG. 2C is a flow chart showing how conventional memory retrieval is performed in an AXI compliant environment.
Figure 3B:
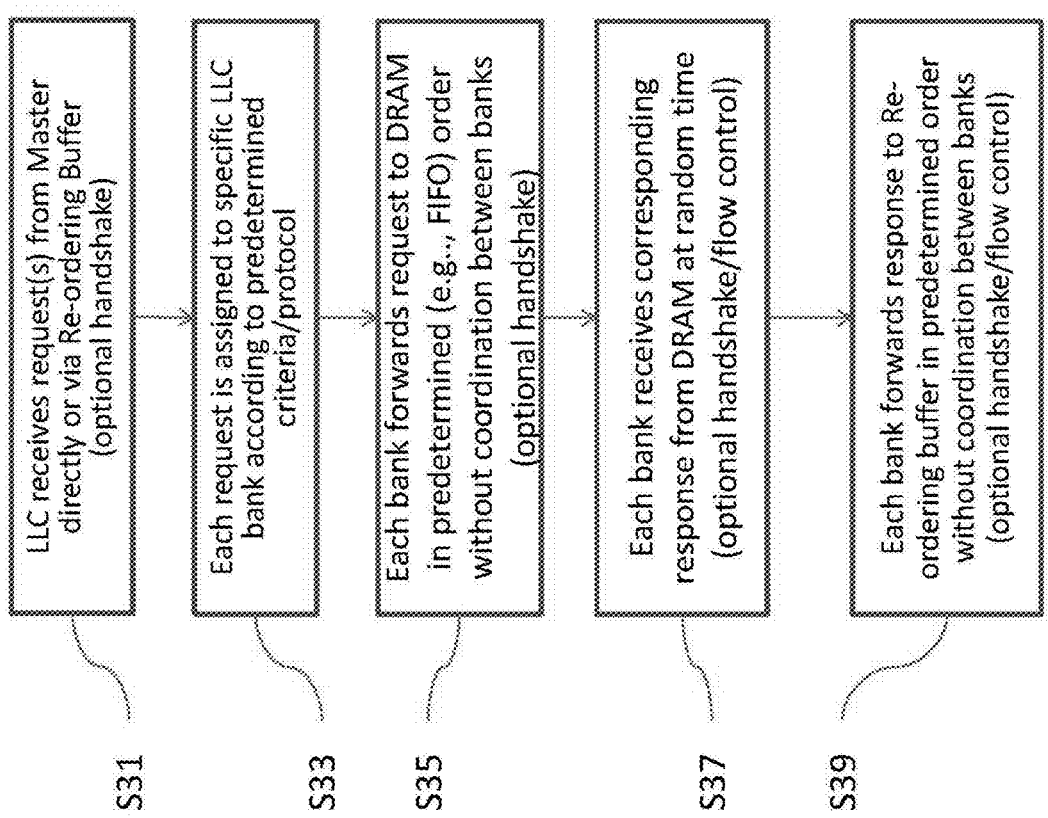
FIG. 3B is a flow chart of operations of a conventional LLC with multiple banks.
Figure 4A:
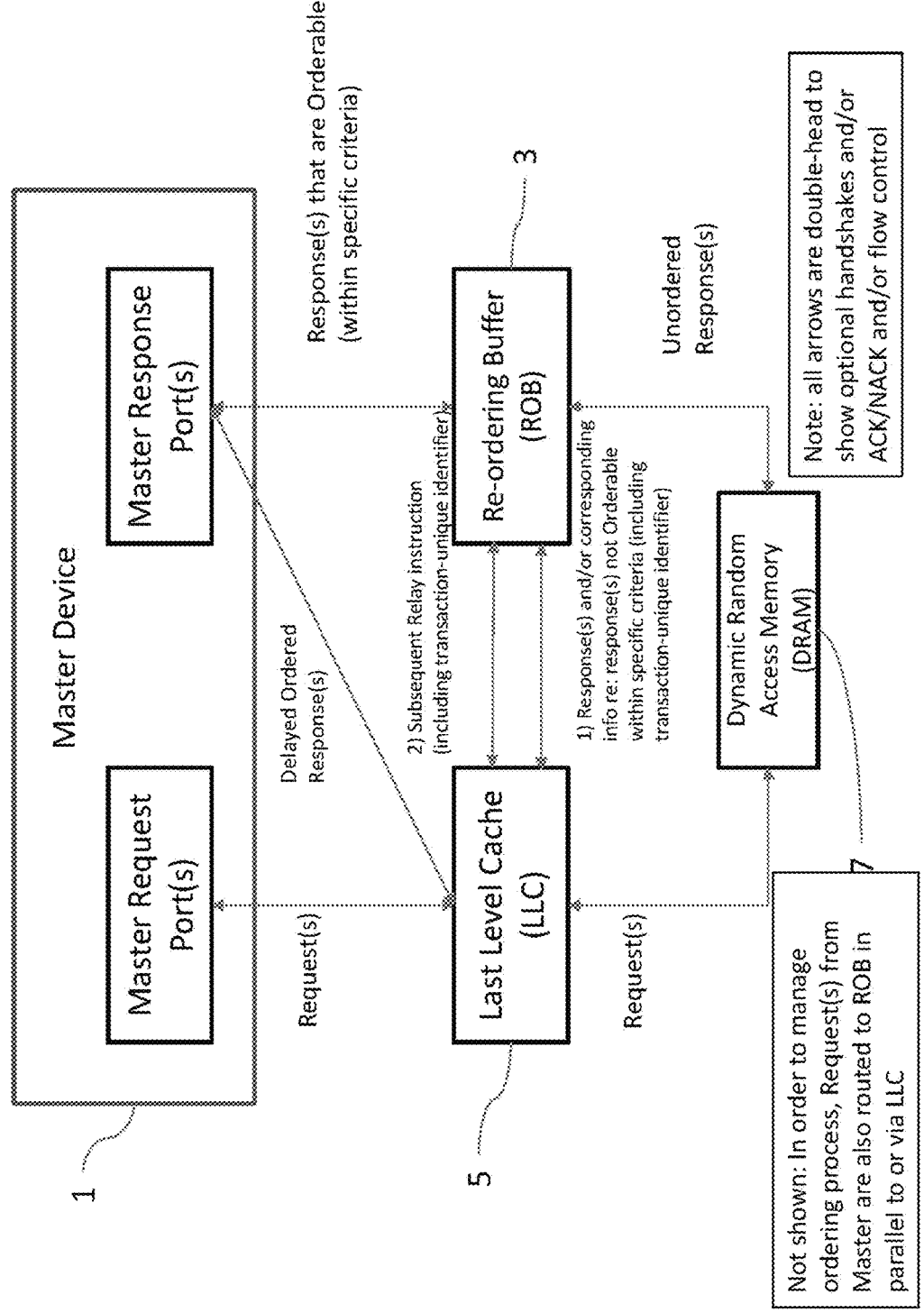
FIG. 4A is a conceptual block diagram showing how memory retrieval is performed in an AXI compliant environment according to a first embodiment of the invention.

FIG. 4A is a conceptual block diagram showing how memory retrieval is performed in an AXI compliant environment according to a first embodiment of the invention. In contrast to the conventional approach of FIG. 2B, the re-ordering buffer (3) of FIG. 4A may receive unordered responses directly from the DRAM (7). Such responses that the re-ordering buffer (3) is able to order/re-order within specific criteria (e.g., timeliness and/or buffer capacity parameters) are sent to the Master Device response port (1B) in the proper order. However, responses that are not orderable within the specific criteria are sent to the LLC (5) with a transaction-unique ID for storage. When the re-ordering buffer (3) determines that it is proper (per the predetermined ordering criteria) for the responses within the LLC (5) to be forwarded to the master response port (1B), the re-ordering buffer (3) sends a notification to the LLC (5) along with the corresponding transaction-unique ID. Based upon this notification, the LLC (5) sends responses corresponding to the transaction-unique ID to the master response port (1B). Because the re-ordering buffer (3) is able to offload certain unorderable responses to the LLC (5), size growth associate with complex operations is assumed by the SRAM-based LLC, not the non-SRAM-based re-ordering buffer. Thus, when sizing LLCs and re-ordering buffers for complex operations, device designers may reduce the size (i.e., number of transistors) in the re-ordering buffer while increasing the size of the LLC. This, in turn enables reduced power and cooling requirements as compared to the conventional re-ordering approach.

Figure 4B:
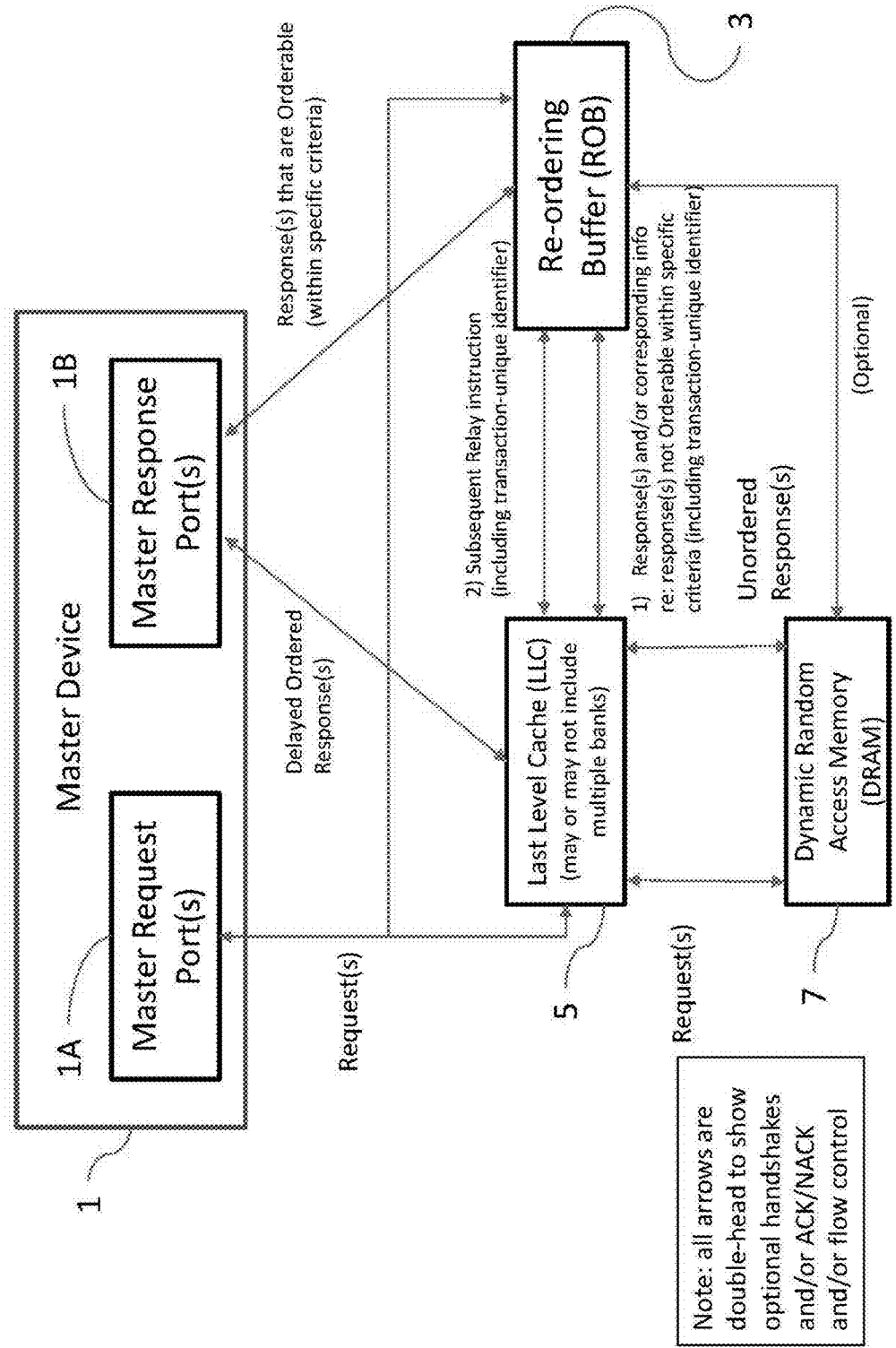
FIG. 4B is a conceptual block diagram showing how memory retrieval is performed in an AXI compliant environment according to a second embodiment of the invention.

FIG. 4B is a conceptual block diagram showing how memory retrieval is performed in an AXI compliant environment according to a second embodiment of the invention. In contrast to the embodiment of FIG. 4A, the unordered responses are sent by the DRAM (7) to the LLC (5). The re-ordering buffer (3) negotiates with LLC (5) about which unordered responses will be accepted by the re-ordering buffer (3) and which responses will be retained by the LLC (5). As in the embodiment of FIG. 4A, transaction-unique IDs are used to enable the re-ordering buffer (3) to identify responses retained by the LLC (5). Responses that the re-ordering buffer (3) is able to order/re-order within specific criteria (e.g., timeliness and/or buffer capacity parameters) are sent to the Master Device response port (1B) in the proper order. However, responses that are not orderable within the specific criteria are retained by the LLC (5) with a transaction-unique ID for storage. When the re-ordering buffer (3) determines that it is proper (per the predetermined ordering criteria) for the responses within the LLC (5) to be forwarded to the master response port (1B), the re-ordering buffer (3) sends a notification to the LLC (5) along with the corresponding transaction-unique ID. Based upon this notification, the LLC (5) sends responses corresponding to the transaction-unique ID to the master response port (1B). Because the re-ordering buffer (3) is able to offload certain unorderable responses to the LLC (5), size growth associate with complex operations is assumed by the SRAM-based LLC, not the non-SRAM-based re-ordering buffer. Thus, when sizing LLCs and re-ordering buffers for complex operations, device designers may reduce the size (i.e., number of transistors) in the re-ordering buffer while increasing the size of the LLC. This, in turn enables reduced power and cooling requirements as compared to the conventional re-ordering approach.

Figure 4C:
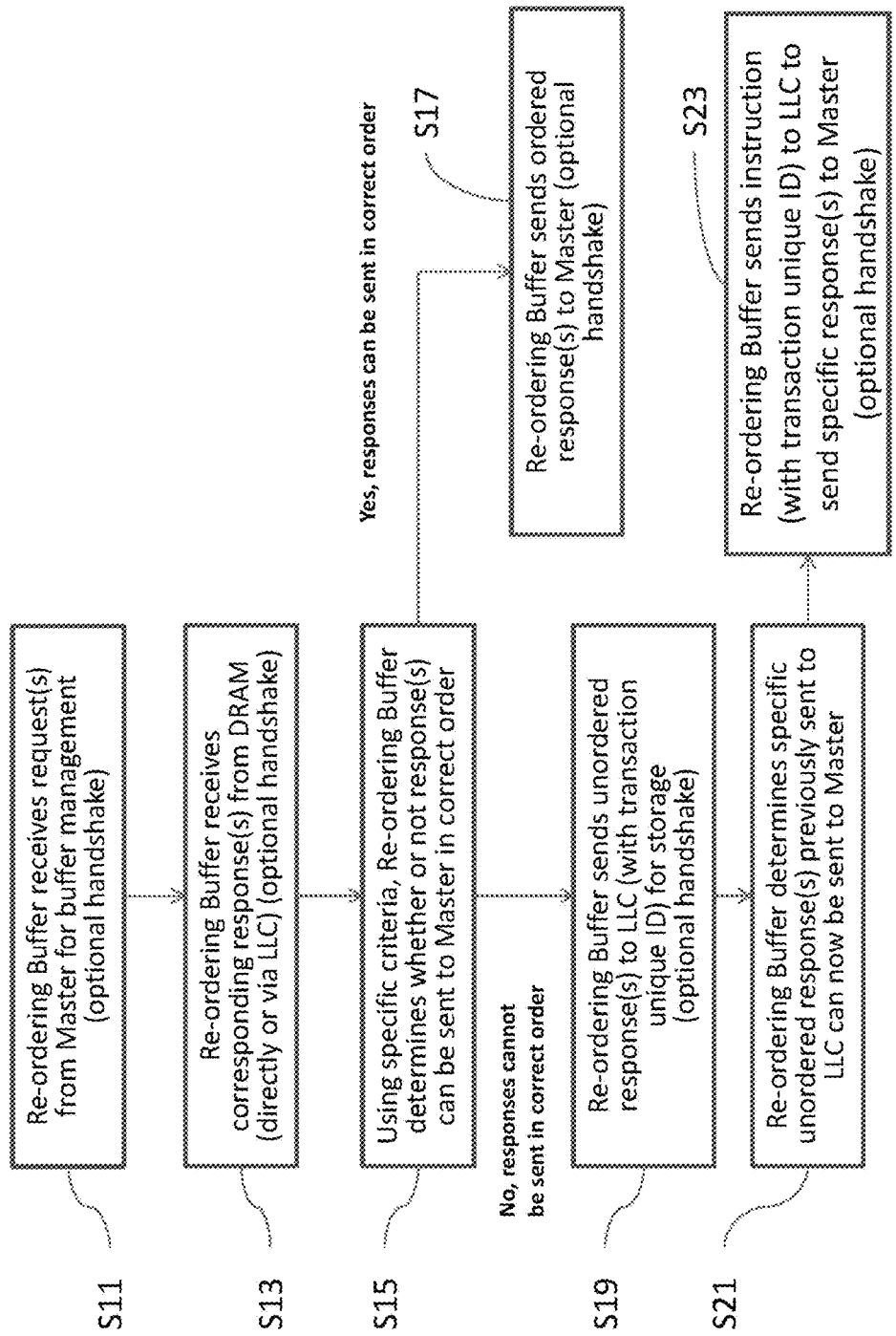
FIG. 4C is a flow chart showing how memory retrieval is performed in an AXI compliant environment according to either the first or second embodiments of the invention.

FIG. 4C is a flow chart showing how memory retrieval is performed in an AXI compliant environment according to either the first or second embodiments of the invention. Here, the re-ordering buffer receives request(s) from Master for buffer management (S11). The re-ordering buffer then receives corresponding response(s) from DRAM (directly and/or via the LLC) (S13). Using specific criteria, the re-ordering buffer determines whether or not response(s) can be sent to the Master in correct order (S15). If the re-ordering buffer determines that certain response(s) can be sent to Master in correct order, the e-ordering buffer sends the certain response(s) to the Master (S17). If the re-ordering buffer determines that certain response(s) cannot be sent to Master in correct order, the e-ordering buffer coordinates with the LLC so that the LLC stores the unorderable responses along with a transaction-unique ID (S19). Later, when the re-ordering buffer determines specific unordered response(s) previously sent to LLC can now be sent to Master (S21), the re-ordering buffer sends an instruction (with the corresponding transaction unique ID) to the LLC to order the LLC to send specific response(s) to Master in the correct order (S23).

Figure 5A:
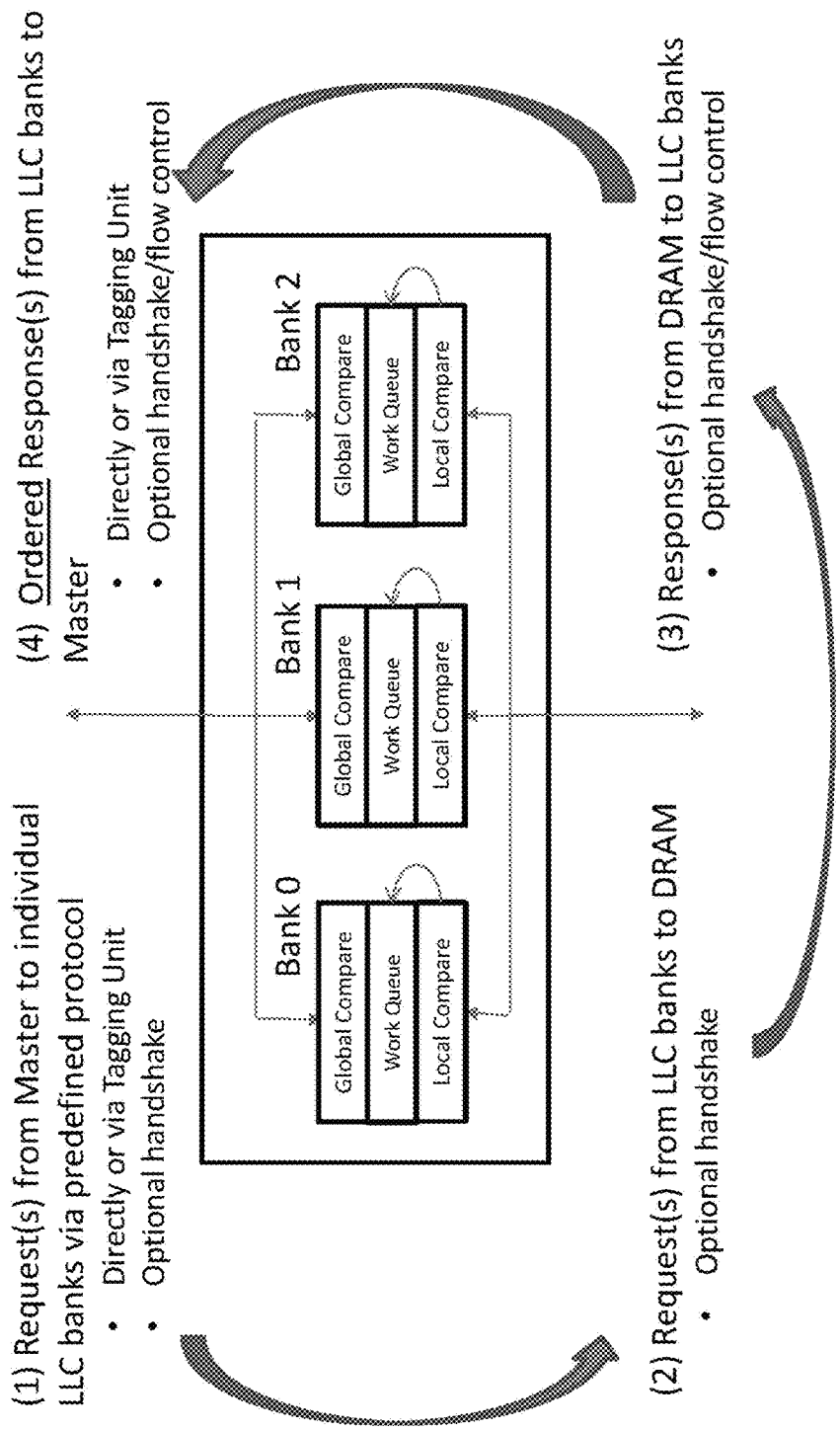
FIG. 5A is a conceptual block diagram of a LLC with multiple banks according to a third embodiment of the invention.

FIG. 5A is a conceptual block diagram of a LLC with multiple banks according to a third embodiment of the invention. Here, an LLC is shown with three banks: Bank 0, Bank 1 and Bank 2. According to the third embodiment of the invention, each bank has a work queue, a global (inter-bank) compare function, and a local (intra-bank) compare function. According to the third embodiment of the invention, requests from the Master (directly or via a to-be-described Tagging Unit) are routed to individual LLC banks by a predetermined protocol (e.g., random, request-type, timeliness, etc.). Each bank handles requests to a portion of the total address space. Request are routed to the bank where the request's address is in range of the bank's specified address range. Each bank sends requests to the DRAM in a random order. Each bank receives responses from the DRAM in a random order. The banks perform intra-bank coordination and inter-bank coordination to place the responses in the proper order prior to sending the response to the Master (directly or via the Tagging Unit).

Figure 5B:
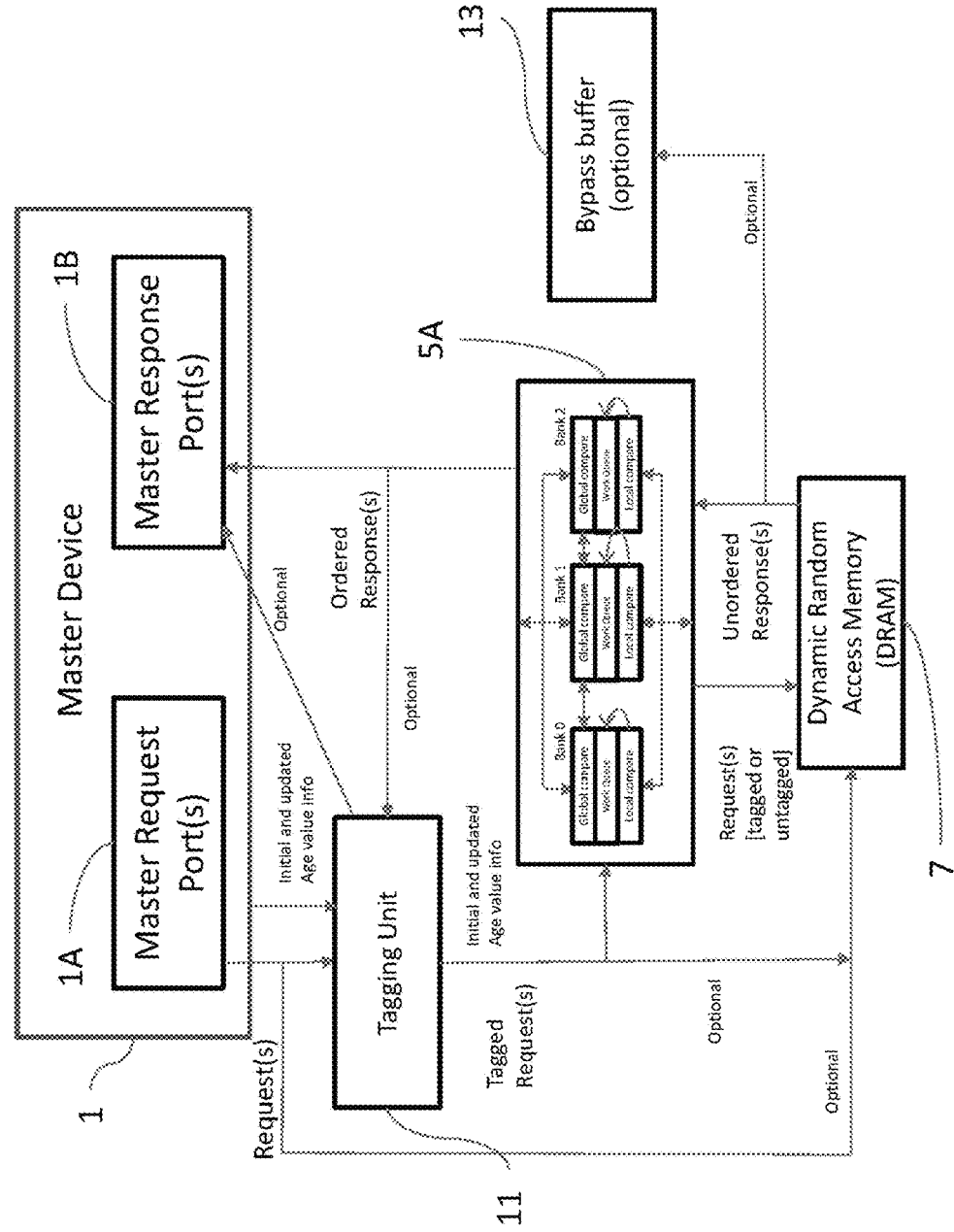
FIG. 5B is a conceptual block diagram of a LLC with multiple banks according to the third embodiment of the invention.

FIG. 5B is a conceptual block diagram of a LLC with multiple banks according to the third embodiment of the invention. Here, certain functions of the re-ordering buffer (3) of Applicant's first and second embodiment are performed by a tagging unit (11) while other functions are performed by the multi-bank LLC (5A). In the third embodiment of the invention, requests from the Master Request Port (1A) may be sent directly to one or more of the Tagging Unit (11), LLC (5A) and DRAM (7). Ordered responses from the LLC (5A) may be sent by the LLC (5A) to the Master Response Port (1B) directly and/or via the Tagging Unit (11). Also shown is an optional bypass buffer that is used to store unordered responses provided by the DRAM. The optional bypass buffer is to store requests that are not to be placed in the LLC but still must obey AXI ordering.

FIG. 5C is a flow chart of operations according to the third embodiment of the invention. Here, the LLC receives request(s) from the Master (directly or via TU) with an age value tag added to each Request. Information about the requests are used by the Tagging Unit, such that, if stored oldest and youngest age values are same, the Tagging Unit indicates to the LLC that the request is the oldest request (S41). Each tagged request is assigned to specific LLC bank according to predetermined criteria/protocol (S43). Each bank forwards request(s) to DRAM in a predetermined order (e.g., first in/first out) without coordination between banks (S45). Each bank receives corresponding response(s) from DRAM at random time (S47). Ordered responses are forwarded by the LLC to the Master (directly or via the tagging unit) after the LLC performs intra-bank and inter-bank coordination based on original and updated age value tag(s) (S49).

FIG. 5D is a more detailed flow chart of operations of a LLC with multiple banks according to the third embodiment of the invention. As noted in FIG. 5C, each bank receives corresponding response(s) from DRAM at random time (S47). Ordered responses are forwarded by the LLC to the Master (directly or via the tagging unit) after the LLC performs intra-bank and inter-bank coordination based on original and updated age value tag(s) (S49). In more detail, the LLC bank with the oldest response forwards this oldest response to Master (directly or via the tagging unit) (S49A). The LLC bank that forwards the oldest response then performs intra-bank ordering (S49B). Specifically, the LLC bank that forwards the oldest response determines if the next oldest response is or is not in same bank. If yes, the LLC bank response forwards this next-oldest response to Master (directly or via the tagging unit) (S49A). This process repeats until this particular LLC bank determines that the next oldest response is not in that bank's work queue (S49B). Upon completion of the intra-bank coordination, the LLC performs inter-bank coordination to determine which other bank has the next-oldest response (S49C). This inter-bank coordination may be performed with one or more other banks, simultaneously or serially. The bank identified by the inter-bank coordination sends the next-oldest response to the Master (directly or via the Tagging Unit) (S49A). The bank identified by step S49C then performs the intra-bank ordering (S49B). The process of FIG. 5D continues until all responses are sent by the LLC in the proper order (i.e, there are no more responses in any work queue in the LLC).

The embodiments of Applicant's FIGS. 4A-4C and FIGS. 5A-5D may be combined.

The above-described embodiments may be used in any manner of telecommunication device such as a smart phone or tablet that includes a user interface, a processor, a memory, a transceiver and an antenna. Such a smart device may be an Android-based device, an iPhone operation system (iOS) based device, or another type of smart device.

The invention claimed is:

1. An Advanced Microcontroller Bus Architecture (AMBA)/Advanced eXtensible Interface (AXI) compatible device comprising:
  a master device including a master request port and a master response port;
  a last level cache (LLC) configured to receive a first plurality of data requests from the master request port;
  a re-ordering buffer configured to receive ordering information about the first plurality of data requests from the master request port; and
  a memory configured to:
    receive a second plurality of data requests from the LLC, the second plurality of data requests related to the first plurality of data requests; and
    in response to the second plurality of data requests, send a plurality of unordered data responses to the re-ordering buffer,
  wherein the re-ordering buffer is further configured to:
    determine whether at least some of the plurality of unordered data responses can be ordered for forwarding to the master response port in accordance with the ordering information;
    upon determining that at least some of the plurality of unordered data responses can be ordered in accordance with the ordering information:
      order one or more of the orderable plurality of unordered data responses; and
      send the one or more ordered data responses to the master response port; and
    upon determining that at least one of the plurality of unordered data responses cannot be ordered in accordance with the ordering information:
      coordinate with the LLC to store the at least one unorderable data response in the LLC along with a transaction identifier (ID);
      subsequently determine that the at least one unordered data response stored in the LLC can be ordered in accordance with the ordering information; and
      send a message with the transaction ID to the LLC to command the LLC to send the at least one data response stored in the LLC to the master response port in accordance with the ordering information.

2. An Advanced Microcontroller Bus Architecture (AMBA)/Advanced eXtensible Interface (AXI) compatible device comprising:
  a master device including a master request port and a master response port;
  a last level cache (LLC) configured to receive a first plurality of data requests from the master request port, the LLC including a plurality of banks,
  wherein each bank of the plurality of banks includes a work queue, an inter-bank coordinator and an intra-bank coordinator, and
  wherein the LLC is further configured to distribute the first plurality of data requests among a first bank and at least one second bank of the plurality of banks;
  a tagging unit configured to:
    receive ordering information about the first plurality of data requests from the master request port; and
    forward at least a portion of the ordering information to the LLC; and
  a memory configured to:
    receive a second plurality of data requests from the first bank and the at least one second bank of the LLC, the second plurality of data requests related to the first plurality of data requests; and
    in response to the second plurality of data requests, send a plurality of unordered data responses to the first bank and the at least one second bank of the LLC, wherein each unordered data response of the plurality of unordered data responses is sent to the first bank or the at least one second bank that sent a respectively corresponding data request,
  wherein the first bank is configured to:
    perform intra-bank coordination to iteratively determine, based on the ordering information from the tagging unit, that the work queue of the first bank contains a response from the memory, the response corresponding to an oldest request of the first plurality of data requests;
    transmit, to the master response port, the response corresponding to the oldest request of the first plurality of data requests,
    upon determining, based on the ordering information from the tagging unit, that the work queue of first bank does not contain a response from the memory corresponding to the oldest request of the first plurality of data requests, perform inter-bank coordination with the at least one second bank to determine whether the work queue of the first bank or the work queue of the at least one second bank contains a response from the memory corresponding to the oldest request of the first plurality of data requests so that the first bank and at least one second bank relay subsequent responses to the master response port in accordance with the ordering information from the tagging unit.

* * * * *